United States Patent [19]
Augier

[11] Patent Number: 4,559,004
[45] Date of Patent: Dec. 17, 1985

[54] APPARATUS FOR MANUFACTURING BRICKS OF COMPRESSED EARTH

[75] Inventor: Robert Augier, Sorgues, France

[73] Assignee: Societe Anonyme de Recherche et d'Etudes Techniques, France

[21] Appl. No.: 643,949

[22] Filed: Aug. 24, 1984

[51] Int. Cl.[4] .................................................. B29C 3/00
[52] U.S. Cl. .................................... 425/261; 425/150; 425/256
[58] Field of Search ............... 425/150, 256, 258, 259, 425/260, 261

[56] References Cited

U.S. PATENT DOCUMENTS

| | | | |
|---|---|---|---|
| 1,564,490 | 12/1925 | Parkhurst | 425/256 X |
| 2,959,900 | 11/1960 | Wollett | 425/258 X |
| 3,008,211 | 11/1961 | Boyd | 425/258 X |
| 3,537,141 | 11/1970 | Burner | 425/256 X |
| 3,730,659 | 5/1973 | Smith et al. | 425/258 X |
| 3,804,570 | 4/1974 | Höschele et al. | 425/261 |
| 4,098,563 | 7/1978 | Prince | 425/261 |
| 4,201,530 | 5/1980 | Vogt | 425/261 X |
| 4,260,349 | 4/1981 | Jones | 425/261 |

FOREIGN PATENT DOCUMENTS 1234528 2/1967 Fed. Rep. of Germany .

*Primary Examiner*—J. Howard Flint, Jr.
*Attorney, Agent, or Firm*—Pollock, Vande Sande & Priddy

[57] ABSTRACT

The method of manufacturing building bricks from an earth-based material, comprises:

providing an open topped variable volume mold (140) whose bottom face is constituted by a piston (156);

placing the open top of the mold under a feeder (95) for supplying earth-based compressible material;

lowering the piston to a predetermined level to gravity load the chamber with a predetermined volume of material;

displacing the mold transversely (204) relative to the loading direction until the said opening is closed by a compression plate;

driving the piston (156) by means of a pressure-controlled jack (160) to compress the contents of the mold chamber to a predetermined pressure;

displacing the mold transversely a second time to disengage the said opening from the compression plate, and raising the said piston by means of the said pressure-controlled jack to eject the compressed-earth product.

15 Claims, 24 Drawing Figures

APPARATUS FOR MANUFACTURING BRICKS OF COMPRESSED EARTH

The present invention relates to the manufacture of compressed earth bricks.

BACKGROUND OF THE INVENTION

The construction of buildings using blocks of dried earth is traditional in many countries, and in particular in hot countries with low rainfall. It appears that rather than developing building materials of a different nature for use in building construction, which materials often require cement to be imported on a large scale, granulates to be crushed, etc., it is often preferable to improve on the local traditional techniques.

Thus, known methods of manufacturing bricks and other building items are based on earth mixed with small quantities of one or more binding materials which serve to stabilize the final product. Excellent results are obtained with this type of material if the mixture is subjected to relatively high pressures during molding.

Numerous types of manually operated machine exist at present for manufacturing such products. The best of such machines are capable of compressing the material to no more than a few tens of bars. Further, such machines are generally of relatively low yield.

Preferred embodiments of the present invention provide an installation, and a machine for manufacturing compressed earth building bricks by means of hyper-compression, ie. using pressures capable of rising to several hundred bars. This is achieved in a simple and reliable manner.

SUMMARY OF THE INVENTION

In a first aspect, the present invention provides apparatus for carrying out a method of manufacturing building bricks from an earth-based material, the method comprising the steps of:

providing a mold in the form of a chamber of variable volume, its bottom comprising a piston and its top being open;

placing the open top of the mold beneath a feeder for supplying an earth-based compressible material;

lowering the piston to a predetermined position such that the volume of the chamber corresponds to a measured quantity of said material as supplied by gravity feed;

displacing the open top of the mold transversely relative to the direction of material flow to a position opposite to a pressure plate;

compressing the contents of the chamber against the said pressure plate by means of the said piston, the piston being driven by a hydraulic jack to apply a predetermined pressure to the said contents;

displacing the mold a second time parallel to the plane of the said pressure plate to disengage the said open top from the pressure plate; and using the same jack to raise the piston to eject the product through the said open top.

The method carried out by the apparatus of the invention makes it possible to manufacture bricks from accurate quantities of earth plus binder and thus to obtain bricks of uniform thickness after application of the predetermined pressure.

In addition, the method greatly simplifies ejection of manufactured bricks since ejection makes direct use of two motions already required in the method for compressing the raw material: translation of the mold; and axial motion of the piston inside the mold.

In a preferred implementation of the method the speed of the piston is reduced towards the end of the compression stroke.

Advantageously, compression starts at a relatively high speed during a first or initial phase followed by a relatively slow speed during a second or final phase.

This makes it possible to reach very high pressures without irregularities appearing in the structure of the material which will constitute the final brick, and is applicable to a very wide range of different kinds of earth.

It is believed that this reduction in speed favors the evacuation of air held between particles of brick material, and that the air escapes in spite of the particles being brought closer together as a result of the increasing pressure.

In a second aspect, the invention provides a particularly simple and reliable machine for implementing the above-defined method.

Such a machine for manufacturing building bricks by agglomerating an earth based material is of the type comprising:

a frame;

a mold composed of a chamber having side walls that are parallel to a generator direction and a piston which is free to move inside the chamber along the said generator direction under the control of piston actuator means, one end of the chamber being constituted by the said piston and the other end of the chamber comprising an opening of the same section as the chamber;

feed means for feeding said chamber with a compressible earth-based material;

a compression plate suitable for closing the said opening to enable the piston to compress the material contained in the chamber, the said feed means and the said compression plate being fixed to the said frame of the machine;

and means for disengaging the said opening relative to the said plate to enable the compressed product to be removed from the chamber;

the improvements wherein:

the said piston actuator means comprise a pressure driven jack;

the mold, including the piston and its actuator means, constitutes moving equipment which is movable relative to the frame for successively positioning the mold opening in a first position opposite the said feed means for filling the mold chamber, then in a second position opposite the said compression plate for compressing the mold fill and then in a third position in which said opening is free from the compression plate and the jack is operative to eject the molded product from the chamber via the opening; and means are provided for turning off the pressure action of the jack prior to moving the said moving equipment from the first position to the second position.

The jack is advantageously a hydraulic jack capable of generating molding pressures of several hundred bars.

In a preferred embodiment, the machine additionally includes means for reducing the speed of the piston at the end of the compression stage.

In one embodiment, the feed means for feeding the earth based material includes a hopper with an Archimedes' screw and a vibrator to facilitate movement of the material to be compressed, the mold chamber being horizontally movable to take up a position beneath the said hopper.

The hopper may advantageously have a flared section directed towards the said opening in order to facilitate filling the chamber. The chamber may be filled by moving the piston from a top position in which its operative face is flush with the opening to a predetermined filling position below the level of the opening, with a sensor being provided to detect when the piston arrives in said predetermined position.

In a preferred embodiment, a plate or tray is provided in the plane of the said opening for collecting the molded product when the mold is moved relative to the frame in a direction transverse to the direction of piston movement after the product has been ejected through the opening by the piston.

Control means may be provided to move the mold assembly including the jack in a first direction from the first position to the second position, and from the second position to the third position, and in a second direction opposite to the first direction from the third position to the first position. When moving in the said second direction, the said plate or tray for recovering the molded product is situated on the opposite side of the feed means closure plate relative to the mold opening.

In a third aspect the invention provides a compression machine useful in an installation for manufacturing bricks by compressing an earth based powder material, the installation comprising a movable frame, a conveyor running from a supply measuring bin and a mixer, and a hopper fed from the mixer and connected to a compression machine as defined above.

A fully self-contained installation is thus obtained which is easy to transport and which can be adapted to making products of different shapes and made up of various materials. In particular, the agglomerating pressure used may vary over a considerable range depending on the type of product concerned.

The overall control of the machine may be provided by very simple hydraulic circuits including pressure sensors and position detectors for detecting the beginning and/or end of each elementary operation and for causing the next operation to take place. It is also possible to obtain automatic operation in a cyclic manner.

BRIEF DESCRIPTION OF THE DRAWINGS

Embodiments of the invention are described by way of example with reference to the accompanying drawings, in which.

MORE DETAILED DESCRIPTION

Figure 1:
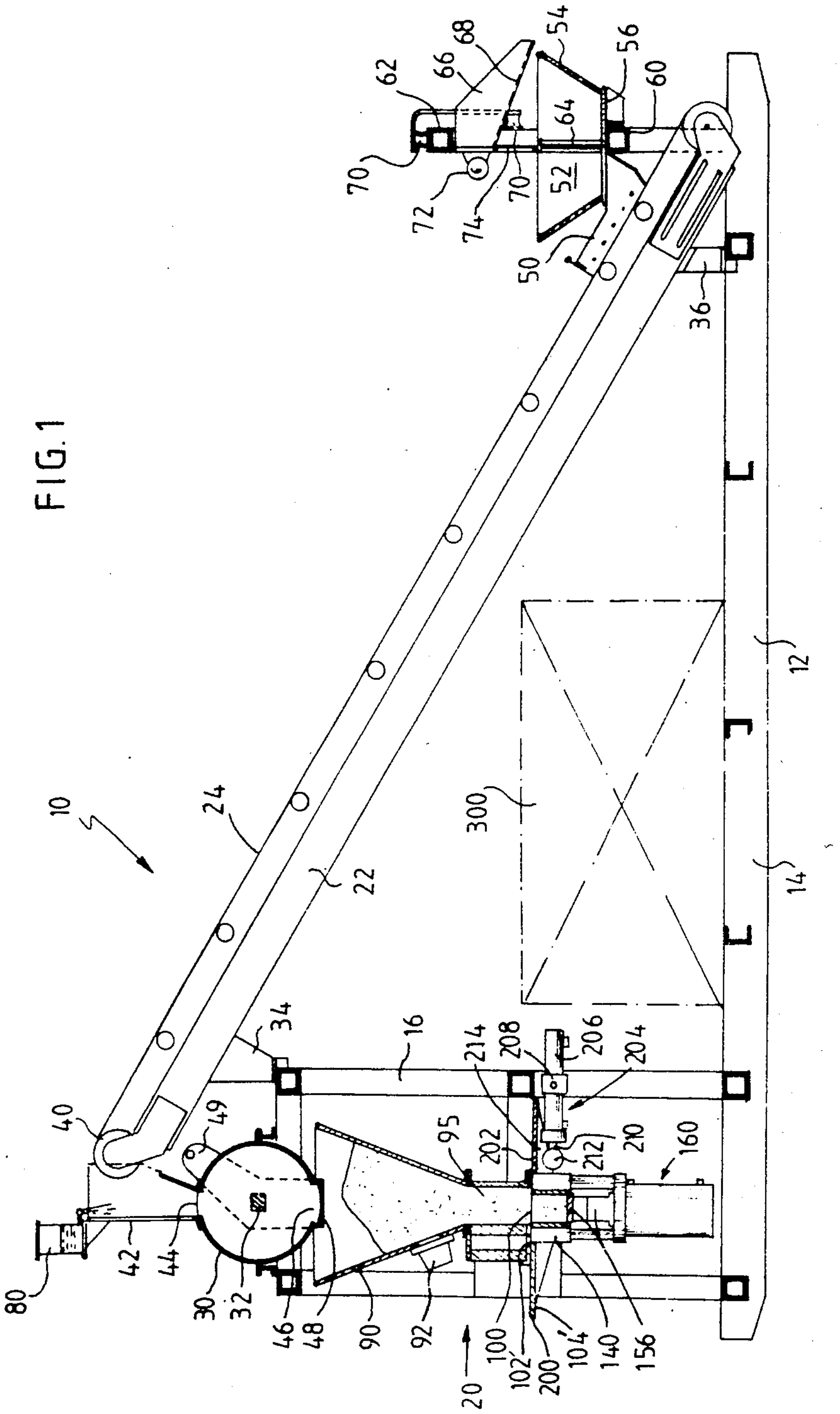
FIG. 1 is an elevation view of an installation in accordance with the invention.

An installation 10 (FIG. 1) for manufacturing products of stabilized and hypercompressed earth comprises a base 12 which may be in the form of a trailer for an articulated truck, or it may be a skid type of welded frame as shown. The base 12 includes longitudinal skids 14 which have a metal framework tower 16 mounted at one end within which an earth block press generally referenced 20 is mounted. Near the top of the tower 16 there is a cylindrical drum mixer 30 having a horizontal axis 32 and driven by a hydraulic motor (not shown).

A strut 34 is also fixed to the top of the tower 16 by means of screws and serves to support the top end of the frame 22 of an endless belt conveyor 24. The other, or bottom, end of the conveyor frame 22 is connected to the other end of the base 12 by another strut 36. The top roller 40 over which the endless belt passes is driven by a hydraulic motor (not shown). The material raised by the belt 24 is discharged into a funnel 42 which communicates with the top of the mixer 30 via an opening 44. The mixer also has a bottom opening 46 which is closed by a pivoting flap or cap 48 which is operable by means of a lever 49.

The bottom end of the conveyor 24 extends beneath a funnel 50 for directing material from a hopper 52 towards the middle of the endless belt. The hopper 52 has sloping walls 54 and an open bottom. It is placed on a sheet 56 which is fixed on a cross beam 60 that is part of a frame 62 fixed to the base 12. The sheet 56 closes the rear half of the bottom of the hopper 52 while leaving the front half open and in communication with the funnel 50. The hopper 52 is divided into two portions by a partition 64 and the hopper and partition assembly is rotatably mounted about a vertical axis. Above the rear portion of the hopper 54 there is a trough 66 having a bottom opening fitted with a riddle 68 suitable for setting the desired grain size of the material to be compressed. The trough 66 is suspended from the frame 62 by two shock-absorbers 70. It is fixed to a vibrator 72 which, when excited, makes the riddle oscillate horizontally relative to the frame.

In operation, the hopper 54 is normally positioned in such a manner that the partition 64 is parallel to the axes of the rollers over which the conveyor belt passes. It thus defines a rear compartment underneath the riddle with its bottom closed by the sheet 56, and a front compartment of the same size which is in communication with the funnel 50. An operator loads the trough 66 with earth until the rear compartment of the hopper 54 overflows. The operator then causes the hopper to turn about so that its contents flows through the funnel 50. A levelling sheet 74 is provided just above the top of the hopper 54. A suitable quantity of additive, eg. 2% cement is then added to the riddled material in the front compartment of the hopper 54.

A second operator, standing on a removable platform (not shown) near the top of the tower 16 can then start the endless belt conveyor 24 in order to load the earth material and the additive into the mixer 30. At the same time the first operator can start filling the rear compartment of the lower hopper 54. Meanwhile, the second operator can add water and a stabilizing additive from a measuring unit 80 situated above the funnel 42 so as to adjust the composition of the material being mixed. When the material is suitably homogenized, the mixer 30 is emptied by means of the lever 49 which opens the flap 48. The mixed material then falls into a main hopper 90 which is a part of the press 20 and which includes a level detector 92. The bottom of the hopper 90 is in communication with a flow chamber 95 and the bottom of the flow chamber is in the same horizontal plane 100 as the outer face of a compression plate 102' and the top face of a tray 104' which is horizontally movable as described below.

Figure 2:
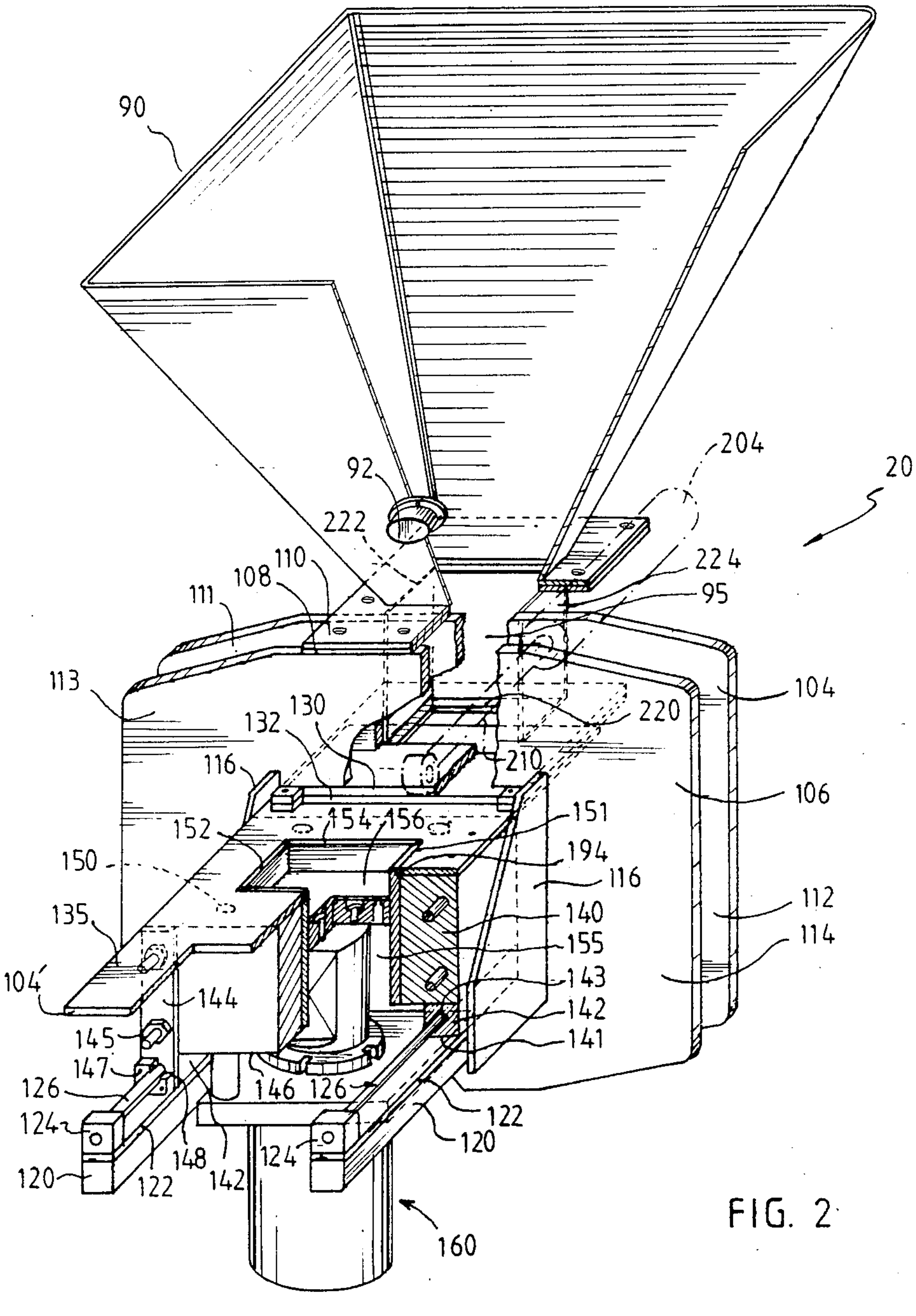
FIG. 2 is a partially cut away perspective view of a compression machine used in the FIG. 1 installation.

As can be seen in FIGS. 4 to 9, the flow chamber 95 is delimited by a wall 102 which slopes slightly towards the back of the machine so as to give the flow chamber a divergent cross section that flares towards the plane 100. A partition on the other side of the flow chamber 95 is delimited by the side face of a vertical plate 104 in the form of an arch. A second plate 106 of similar shape is mounted parallel to the plate 104 and in front of the plate 104 (see FIG. 4). These plates are the main components of a welded frame for the press 20. The tops of the arches 104 and 106 are interconnected by a metal sheet 108 on which a bottom flange 110 of the hopper 90 is screwed. Each of the plates 104 and 106 has two verticl arms pointing downwards such as 112 and 114 respectively (see FIG. 2). The inside faces of matching arms 112 and 114 are interconnected by respective vertical metal sheets 116 such that the two facing sheets or cheek pieces 116 define a channel therebetween. The inside bottom portions of the plates 116 are fixed to horizontal slide supports 120. These supports are constituted by square section bars with rubbing plates 122 fixed to their top surfaces to serve as slide ways in a manner described below. At each end, the bars 120 have lugs 124 mounting cylindrical bars 126 that lie parallel to the respective slide ways 122 and that extend over the entire length thereof.

The two plates 104 and 106 are also interconnected at the bottoms of their respective horizontal portions 111 and 113 by a horizontal table 130 which constitutes a compression table and which has a rubbing sheet 132 fixed, eg. by screws, to its inside face for withstanding the compression forces described below. These two sheets are also visible in FIGS. 4 to 9. The bottom face of the rubbing sheet 132, or counter-punch, lies in the above-defined horizontal plane 100.

The top face 135 of the horizontal steel tray 104' is movable in this plane 100. The horizontal tray is a part of moving equipment which is movable on the supporting slideways of the check pieces 116.

The moving equipment includes a mold matrix 140 made of steel and in the shape of a parallelipiped block. The bottom face of the block has two slide members 142 of spheroidal graphite cast iron each of which has a bore 143 for receiving a respective one of the cylindrical guide rods 126. Each of the slide members is fixed to two vertical support bars 144, one at each end of the block 140. These vertical bars are fixed by means of screws 145 and the bottom portions thereof extend below the bottom face of the mold matrix. The bottom end of each of the bars 144 is fixed to a housing 147 fitted on the inside with a sealing ring 148 which is in contact with outer surface of the cylindrical rod 126 and acting as a scraper thereto.

The tray 104' is mounted, eg. by means of screws 150, on the top face of the block of the mold matrix 140. It has a rectangular opening 151, whose sides are flush with the sides of two longitudinal vertical plates 154 and two lateral verticl plates 152 constituting the sides of a mold chamber located in a hollow 155 in the matrix block 140. The plates 154 and 152 define a chamber of variable volume which is open at its top and bottom, and which has a moving bottom constituted by a punch or wall 156 suitable for moving vertically under the action of a double acting jack given the general reference 160.

The punch 156 is mounted (see FIG. 3) by screws 162 to the top of a pressure plate 164 which is itself mounted by screws 166 to the top of a jack rod 168 provided with diametrically opposed flats 170. The distance between the flats enables the rod 168 to penetrate into the mold chamber between the plates 152.

The jack 160 comprises a body 180 having an upper flange 182 through which the rod 168 passes. The flange 182 is fixed to the matrix block 140 by four drawbars 184 placed at four corners of the flange, with each drawbar compressing two distance pieces 186 and 188. The distance pieces 186 hold the bottom portions of the plates 152 and 154 constituting the sides of the mold chamber. The heads 190 of the drawbars 184 are sunk in housings inside the blocks and covered by the tray 104'. The tray holds down the plates 152 and 154 by means of a shoulder 194 formed in the outside top edges thereof (see FIGS. 2 and 3).

The tray 104' covers the top of the matrix block 140 over the full width of the plates or cheek pieces 116. It overlaps in front and behind the cheek pieces providing a forward projection 200 and a terminal portion 202 whose functions are explained below.

A horizontal jack 204 (FIGS. 4 to 9) has a body 206 which is fixed by a bracket 208 to the tower 16 (FIG. 1). The horizontal jack rod 210 is hinged at one end 212 two angle irons 214 fixed to the rear end 202 of the tray 104' (see FIG. 1).

The jack 204 serves to move the moving equipment constituted by the mold matrix 140 and the associated jack 160 horizontally along the rectified treated steel guide rods 126. The weight of the moving equipment and the forces to which it may be subjected under the action of the jack 160 are transmitted by the lower faces 141 of the slide members 142 directly to the upper face of the rubbing sheet 122 fixed to the arch frame 104, 106.

The structure does not require the mold matrix block 140 to be accurately machined in order to obtain proper guidance relative to the tower. The supports of the slideways 122 serve as rubbing parts and are easy to change. By the nature of the materials in contact (spheroidal graphite cast iron for the slide members 142 and rectified treated steel for the guide rods 126) and the scraper sealing ring for cleaning, no greasing is necessary. The guides 126 can perform their function without being subjected to the forces exerted between the mold matrix 140 and the frame compontents 104, 106. These forces are transmitted via the contacting faces of the slide members 142 and the supports 122 of the slideways, with the guides 126 being slightly flexible.

The jacks 204 and 160 are double acting jacks mounted in a hydraulic circuit which is shown in very diagrammatic form at 250 in FIGS. 4 to 9. The hydraulic circuit is made in conventional manner and comprises a set of conduits connected by valves to a pump and to a hydraulic fluid return tank. A system of controlling electrically-operated valves is contained in a box 251 at which ducts 252 and 253 for controlling opposite faces of the jack 160 are terminated, as are control ducts 254 and 255 acting on opposite faces of the jack 204. The positions of the valves in the box 251 are under the control of a logical function described below based on measurements performed by threshold pressure sensors or "pressurestats" such as 260 and 261 and on signals from end-of-travel switches which are also described below.

In the rest position of the machine the punch or wall 156 (FIG. 4) has its top face in the plane 100, and the rod 168 of the jack 160 on which the punch is mounted is fully extended into the chamber defined by the mold chamber walls 152 and 154.

The jack 204 has its rod retracted in a position such that the opening in the plane 100 at the top of the mold chamber is exactly underneath a rectangular opening 220 through the compression table 130 and the rubbing plate 132 immediately beneath the bottom of the flow chamber 95. The horizontal square section of the flow chamber 95 is delimited by the frame plate 104, the sloping plate 102, and two side plates 222 and 224 (see FIG. 2).

Figures 4, 5, 6, 7, 8, 9:
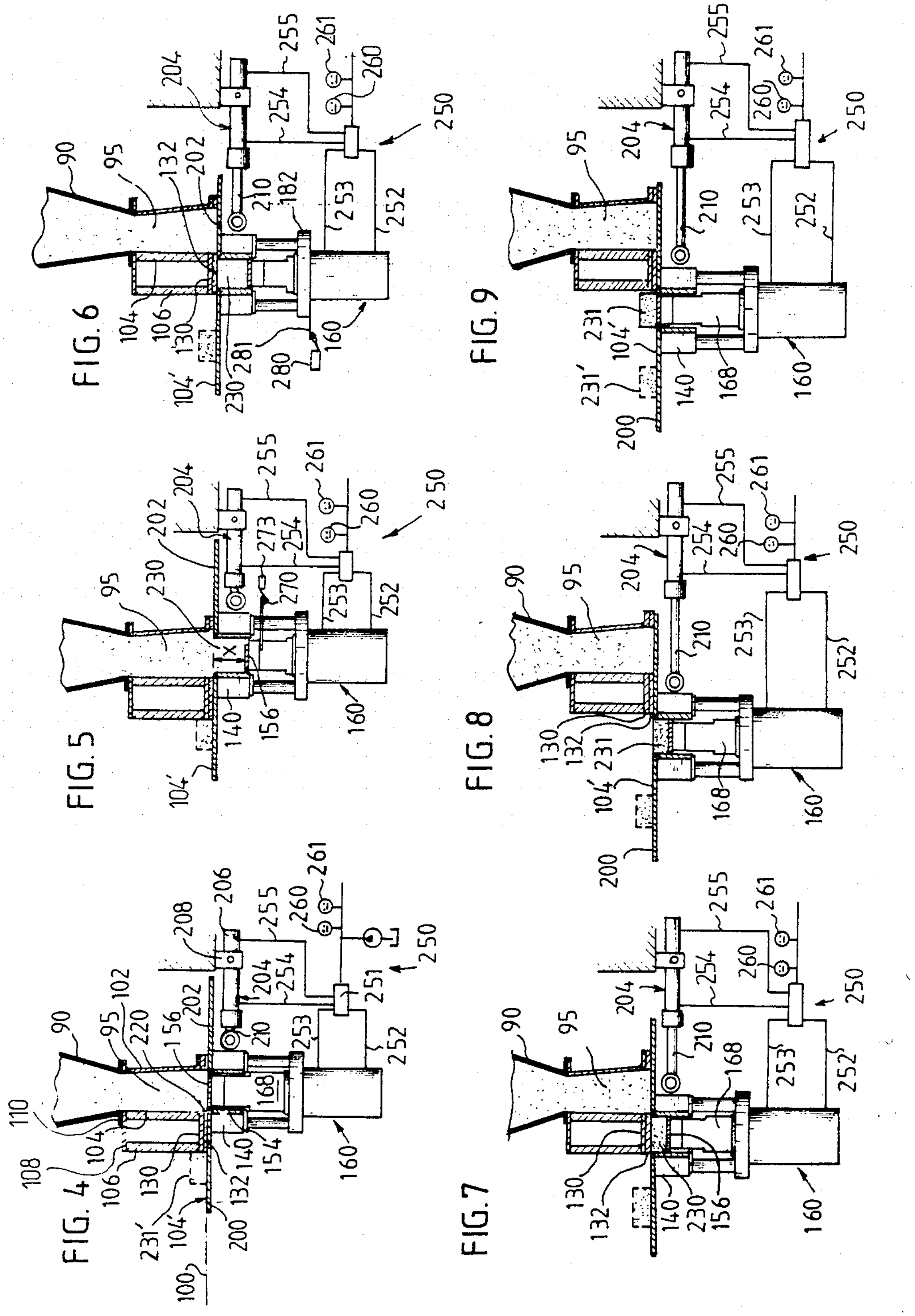
FIGS. 4 to 9 show different stages in the operation of the FIG. 2 machine.

The position shown in FIG. 4 defines a first horizontal position for the moving equipment comprising the mold matrix 140 and the jack 160 relative to the tower 16 as represented by the arches 104 and 106.

Figure 3:
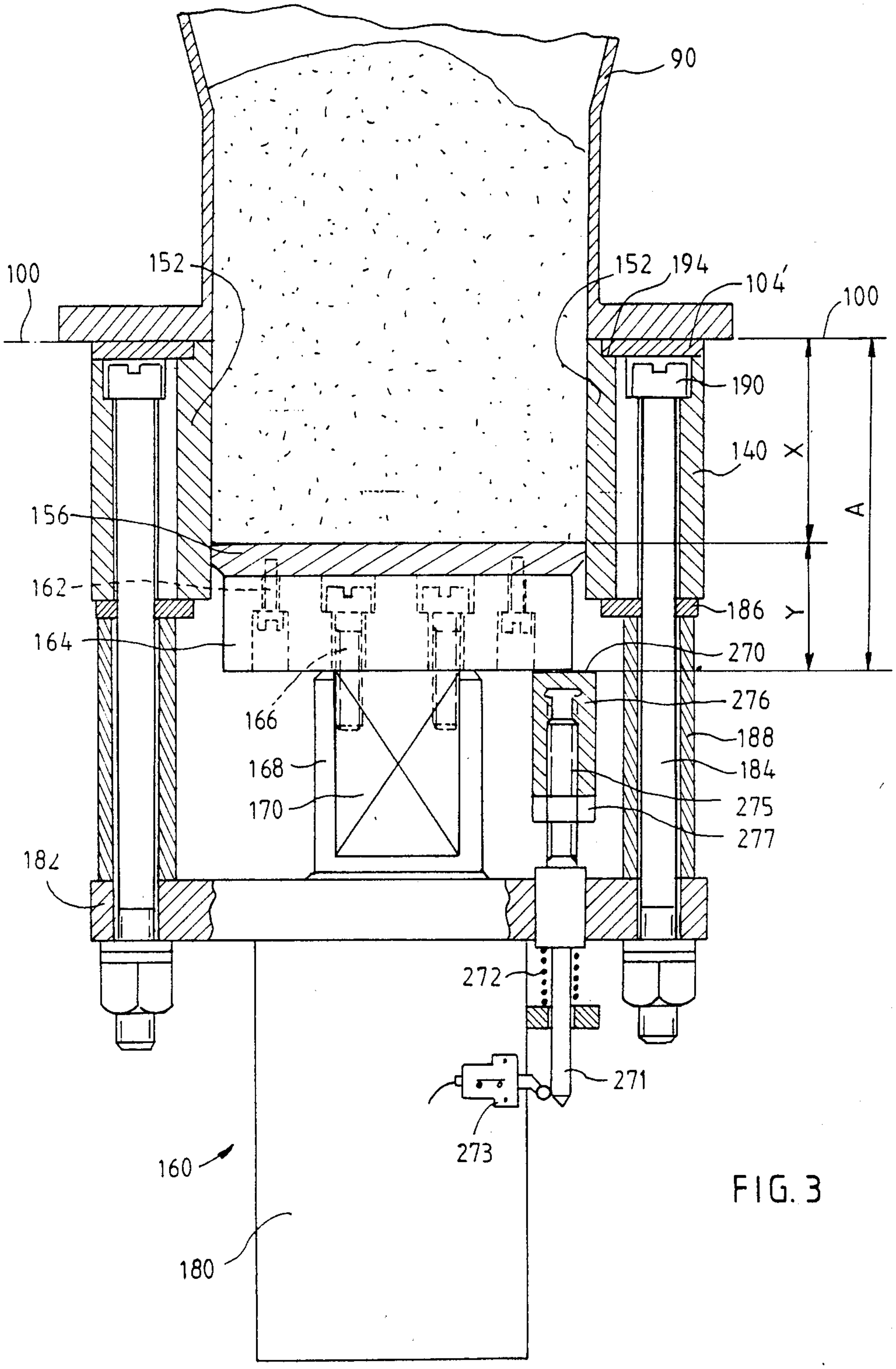
FIG. 3 is a section in a vertical plane through the FIG. 2 machine.

On starting the machine from this rest position, pressure is applied to the duct 253 to lower the rod 168 of the jack 160. As the piston moves down, a flow of expanded material follows it under the effect of gravity from the flow chamber 95 into the mold chamber 230 as defined by the plates 152 and 154 and the top of the punch or piston 156. Chamber filling is stopped (FIG. 5) when the jack rod 160 has moved a distance X which is predetermined as a function of the desired thickness for the compressed product, the consistency of the material, and the pressure to which it is to be subjected during compression. The downward motion of the of the jack 160 is stopped by the pressure plate 164 engaging a stop 270 (FIG. 3). As it engages the stop, a rod 271 is pressed against a return spring 272 and the end of the rod 271 actuates an end-of-stroke microswitch which causes hydraulic power to be removed from the duct 253.

The distance X which determines the filling volume of the chamber 230 is adjustable in advance. The top of the rod 271 is threaded at 275. The stop 270 is constituted by the top of a tapped cap 276 which is screwed onto the thread of the rod 271, and which is held in place by a locknut 277. The rod 271 is slidable through the flange 182 of the jack 160.

Thus, different filling volumes may be obtained for the mold chamber by adjusting the position of the stop 270, and as a result, products of different thicknesses can be obtained after compression. Adjusting the position of the stop 270 also makes it possible to obtain bricks of uniform size in spite of various different raw materials being used, ie. it serves to compensate for varying water content and compressibility of the raw material.

Once the chamber 230 has been filled (FIG. 5), the microswitch 273 switches the hydraulic pressure over from the duct 253 (thus stopping the rod of the jack 160) to the duct 255. The jack 204 then starts to extend its rod 210 which had previously been fully retracted and the entire moving equipment takes up a second or intermediate position shown in FIG. 6. As it moves from the first position to the second position, the equipment shears the flow of expanded material from the flow chamber 95 into the mold chamber 230, and in particular, the rear portion 202 of the tray 104' slides in the horizontal plane 100 to close the bottom opening 220 of the flow chamber 95. In the position shown in FIG. 6, the top opening of the mold chamber 230 is placed against the rubbing sheet or counter punch 132 which protects the compression plate 130 that is fixed to the arch structure 104, 106. The arrival of the moving equipment in the second position shown in FIG. 6 is detected by a microswitch sensitive to an end-of-stroke stop 281 fixed to the flange 182 of the jack 160.

The microswitch 280 switches off the supply of oil to the duct 255 and switches on the supply of oil to the duct 252 leading to the bottom of the jack 160. Its rod 168 is then pushed upwards and the material in the chamber 230 is compressed between the punch 156 and the compression plate 130 via its counter punch 132. The pressure in the duct 252 is monitored by a pressurestat 260 (FIG. 7).

The pressure in the jack 160 is directly related to the pressure in the compression chamber 230, and once the pressure in the jack 160 reaches a predetermined value (which may correspond to a pressure of several hundred bars for the material under pressure), the pressurestat 260 causes an electrically controlled valve to switch off the supply of oil under pressure to the duct 252 and to switch the supply of oil under pressure back to the duct 255 to cause the rod 210 of the jack 204 to continue advancing. This causes the moving equipment constituted by the mold matrix 140 and the jack 160 to advance from the second position (FIG. 7), to a third position (FIG. 8) in which the rod 210 is completely extended from the body of the jack 204. The opening of the compression chamber 230 in the tray 104' is now free from the compression plate 130 and its counter punch 132. Once the rod 210 reaches the end of its stroke, the pressure in the duct 255 increases (FIG. 8) and a pressurestat 261 detects this increase in pressure. The pressurestat then causes an electrically operated valve to turn off the supply of oil under pressure to the duct 255 and to feed oil under pressure to the duct 252 leading to the bottom of the jack 160. This causes the rod 168 to move upwardly thereby ejecting the compressed product 231 from the variable volume chamber 230 to a position shown in FIG. 9. Once the rod 168 reaches the end of its stroke the bottom face of the molded product 231 is flush with the top surface of the tray 104'. The resulting increase in pressure in the duct 252 is again detected by the low pressure pressurestat 261. This causes an electrically operated valve to turn off the supply of oil under pressure to the duct 252 and to apply pressure to the duct 254. The rod 210 of the horizontal jack 204 is then retracted. The moving equipment 140, 160 moves back from the third position shown in FIG. 9 past the arch frame 105, 106 to the first position shown in FIG. 4. At the beginning of this stroke, the side of the molded product 231 abuts against the plate 106 and slides over the top surface of the tray 104' until it rests on the forward portion 200 thereof is is shown in dashed lines at 231' in FIG. 4. One cycle is thus completed and the equipment is ready to begin a further cycle.

The rear portion of the tray 104' thus closes the material outlet from the flow chamber 95 when the moving equipment is in its second and third positions of its manufacturing cycle. At the same time the front portion 200 of the tray serves to support the finished product after it has been ejected from the mold so that it can be removed by means not shown, or simply picked up by an operator. The tray can be made large enough to hold several successive finished products, eg. bricks. At the same time, by virtue of its engaging the top edges of the mold plates 152 and 154 it holds them in position during the compression and ejection processes.

The cycle is entirely automatic. The mold starts refilling as soon as the horizontal rod 210 has moved fully home (FIGS. 9 and 4). The increase in pressure in the duct 255 is then detected by the pressurestat 261 which causes the hydraulic fluid pressure to be removed from the duct 255 and applied to the duct 253 for lowering the jack 160.

The resulting machine is not only entirely automatic in operation, but is also very simple to implement and is capable of operating under many environments. The control circuits of the machine may be driven by a diesel generator set 300 located on the skid frame 12 (FIG. 1) underneath the conveyor 22.

Such a machine can produce products which have been compressed to 200 to 300 bars using a binder comprising 0 to 4% cement depending on the end use of the product together with small quantities of an optional stabilizer such as Kariti (Shea tree butter), ammonium salt, urea, formol, etc. The product may be in the form of rectangular bricks 29 cm×14 cm×9 cm capable of being used as ordinary construction bricks in conjunction with mortar. The compression strength of the bricks is three to four times greater than the strength of bricks obtained by compressing the same earth to low pressure (eg. 40 bars). Nonetheless, the machine, the method, and the installation in accordance with the invention are not limited to producing such bricks. In particular, by using different punches, all sorts of hollow products suitable for building associated functions can be made, eg. hollow blocks, tiles, guttering, and paving slabs of various shapes, eg. hexagonal or interlocking. To do this, the mold matrix 140 needs to be dismantled and side plates 152 and 154 of suitable shape need to be fitted, together with an appropriately shaped punch 156 and counter punch 132.

The invention is naturally applicable to molding any type of earth, including earth without any added binder if the raw earth contains enough clay. It may also be applied to other agglomerable materials, and its operating pressure may be adjusted.

The control logic is very simple. modifications of the set pressures can readily be obtained by acting on the pressurestats 260 and 261.

The piston at the bottom of the variable volume mold chamber 230 remains aligned on the axis thereof by virtue of the jack being a part of the same moving equipment as the mold. It is a combined mold-and-jack structure which is moved.

The desired functions are obtained by suitably combining only two translation movements. Each movement is controlled by means of a respective jack, one of which is horizontal and the other of which is vertical. In particular, the same jack serves to eject the finished product from the mold, to fill the mold and to compress the material in the mold. All three actions are performed by easily-produced translation motions.

Reference is now made to FIGS. 10 to 17 which are diagrams showing various stages in the operation of the machine showing the means used for automating this operation.

Figure 10:
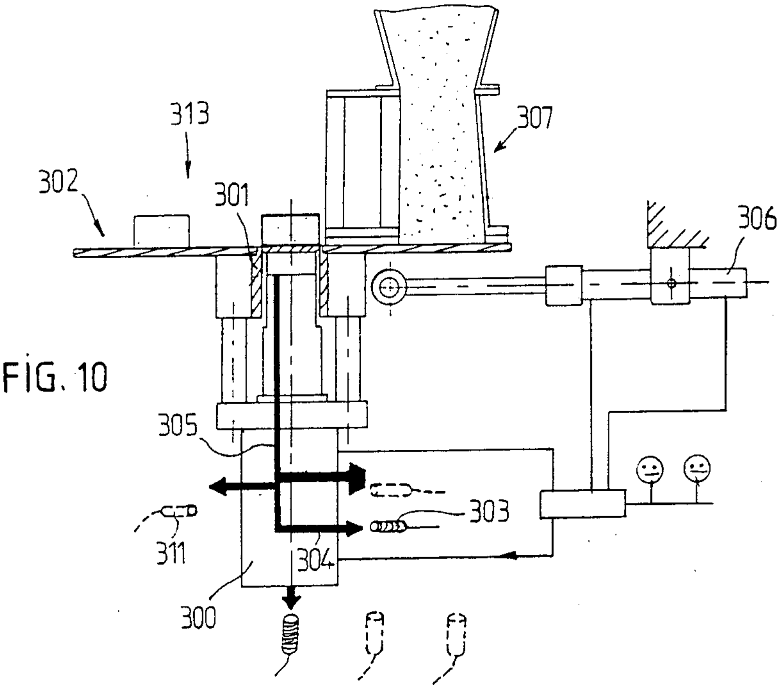
FIG. 10 is a simplified view of a brick-making apparatus in accordance with the invention showing a hydraulic circuit thereof.
Figure 11:
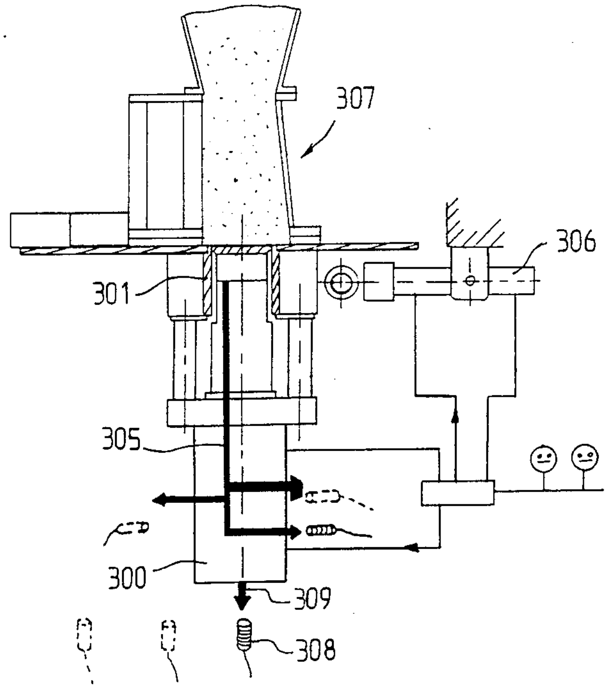
FIGS. 11 to 17 are similar views to FIG. 10 under various different conditions.

In the condition shown in FIG. 10, referred to as stage O, the mold 301 is opposite the front portion 302 of the press. A position detector of the inductive type 303 co-operates with an index member 304 which is fixed to the vertical rod 305 of the jack 300 to detect that it is fully extended in order to authorize passing to the following stage or stage I.

As it moves, ie. during the O-I phase, the mold 301 is drawn horizontally by the jack 306. It retracts until it comes under the hopper 307 while the rod 305 of the jack 300 remains extended since the bottom chamber of the jack remains under pressure. When a detector 308 detects an index 309 (FIG. 11) mounted on the body of the jack 300, the mold 301 is stopped. The detector 308 then authorizes passage to the next stage or stage II.

Figure 12:
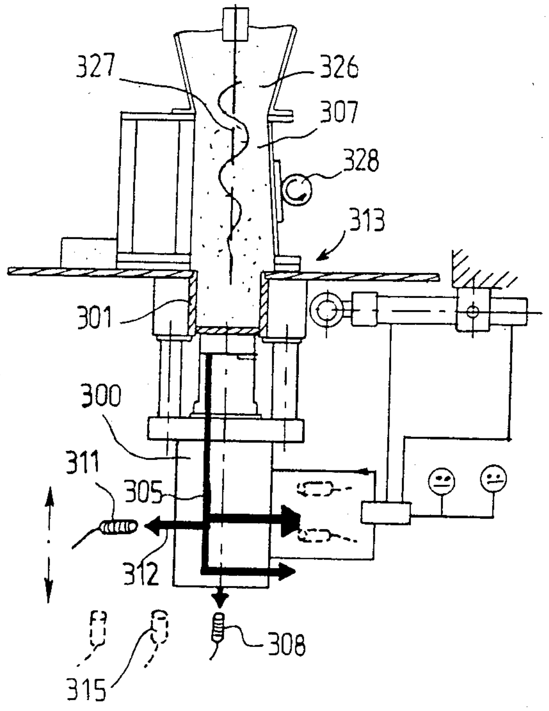
Figure 13:
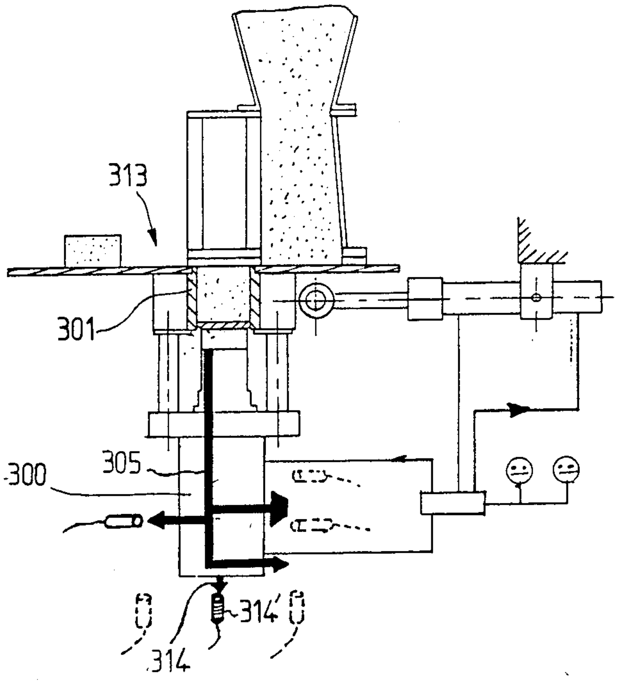

As it passes from stage I to stage II (filling phase I-II), the rod 305 of the jack 300 moves down, thus admitting a determined volume of earth into the mold 301 from the hopper 307. This volume of earth is adjustable by adjusting the position of a detector 311 for detecting the end of the down stroke of the rod by co-operating with an index 312 on the rod (FIG. 12). The said detector 311 serves to authorize passage to the next stage, or stage III.

As it passes through phase II-III, the mold 301 moves forwards under the press frame 313. An index 314 on the body of the jack 300 co-operates with a position detector 314' (FIG. 13) to stop movement of the mold and to authorize passage to the next stage or stage IV.

Figure 14:
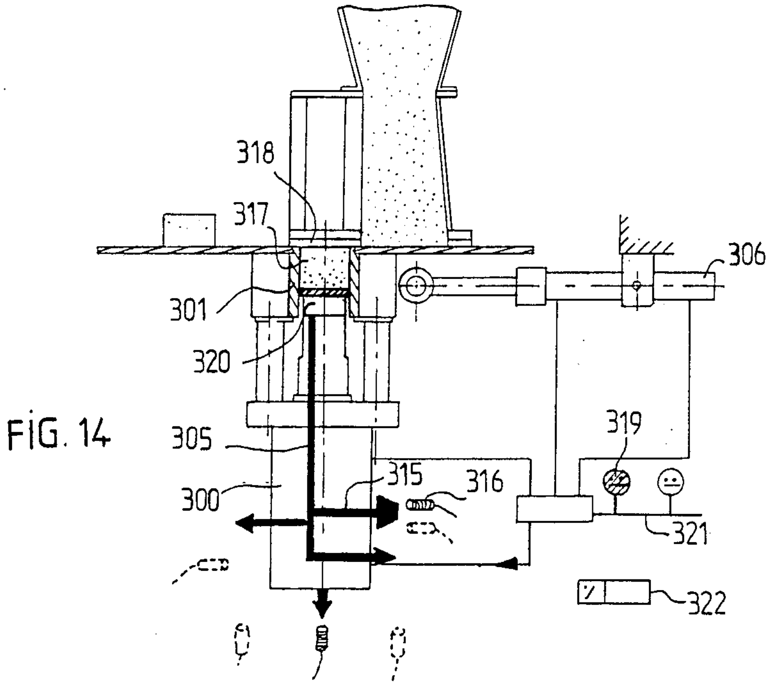
Figure 15:
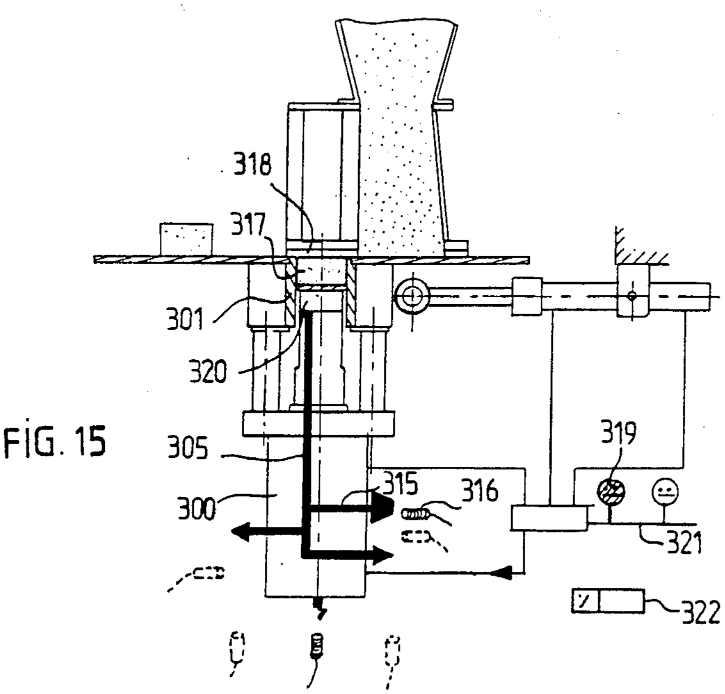
Figure 16:
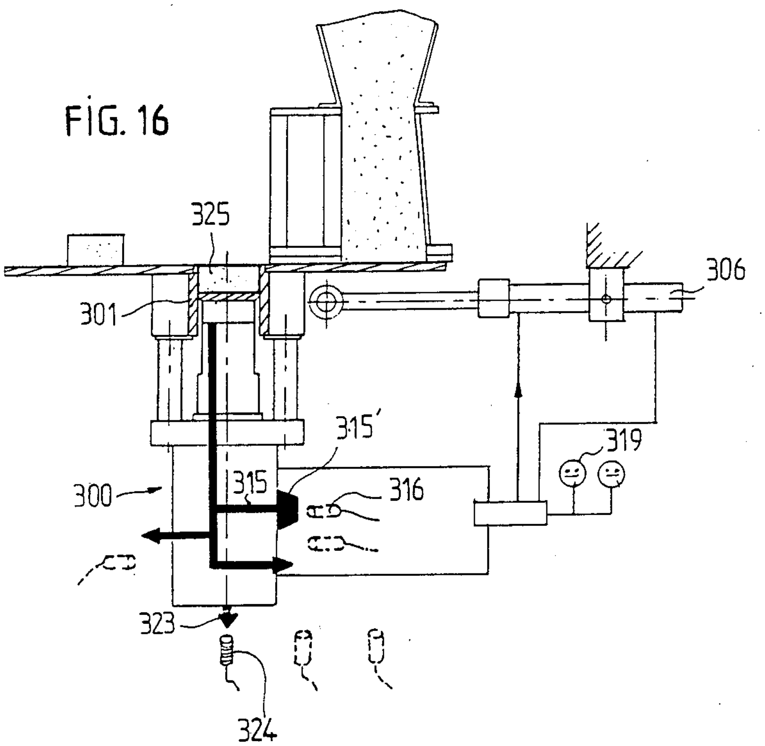

As it passes through phase III-IV, the rod 305 of the jack 300 compresses the earth in the mold by means of the piston 320. An index 315 moves with the rod and co-operates with a detector 316 when the jack rod is at an intermediate position on its stroke, eg. about half way (FIG. 14). The intermediate position may be adjusted by modifying the position of the detector 316. In this intermediate position, the detector controls the hydraulic circuit of the jack 300 in such a manner as to reduce the speed at which the rod of the jack is extended.

The movement of the rod 305 of the jack 300 during the phase III-IV thus takes place at two speeds: as relatively high speed until the index 315 co-operates with the detector 316, and a relatively slow speed while the index 315 co-operates with the detector 316.

To this end, the index 315 is in the shape of an elongate shoe whose height is so determined that the slow speed is maintained for a determined fraction of the stroke of the jack.

Figure 18:
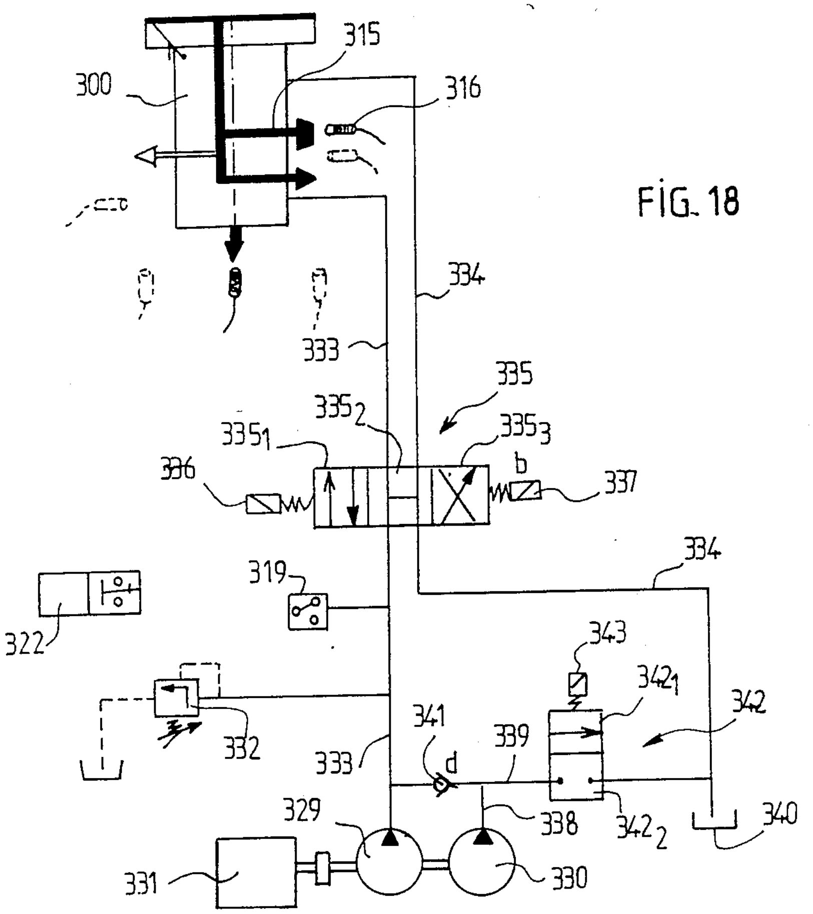
FIG. 18 is a detailed hydraulic circuit diagram for the apparatus of FIGS. 10 to 17.

As can be seen in FIG. 18, two pumps 329 and 330 are synchronously driven by a motor 331 and apply oil under pressure from a source 332 to the body of the jack 300. The jack body is fed via two ducts 333 and 334 respectively for extending and retracting the rod of the jack. The distribution of hydraulic fluid in the ducts 333 and 334 can be modified by means of a three position valve 335 in which the three positions $335_1$, $335_2$ and $335_3$ are controlled by means of two windings 336 and 337. The three positions $335_1$, $335_2$, and $335_3$ correspond respectively to the rod extending, remaining stationary, and retracting.

Via a duct 338, the pump 330 is in communication with a duct 339 that leads firstly to the duct 333 close to the pump 329 and secondly to the duct 334 close to a return tank 340. On the section of duct 339 lying between the pump 330 and the duct 33 there is a non-return valve 341 while the other section includes an electrically operated valve 342 having two positions $342_1$ and $342_2$ and actuated by a winding 343. In the position $342_1$ the output from the pump 330 is sent to the tank 340, while in the position $342_2$ communication between the duct 339 and the tank 340 is cut so that the output from the pump 330 is added to the output from the pump 329, by passing through the non-return valve 341.

At the beginning of the III-IV phase, the winding 336 is excited and the valve 335 is in position $335_1$, while the winding 343 is not excited and the valve 342 is in the position $342_2$. As a result the duct 333 is supplied by the outlet from both pumps 329 and 330 so that the ensuing extension motion of the jack's rod is fast, or at least relatively fast.

When the index 315 actuates the detector 316, the detector excites the winding 343 of the valve 342, thereby directing the output from the pump 330 to the tank and leaving only the output from the pump 329 feeding the circuit. The danger of backflow and unwanted vacuum is avoided by the non-return valve 341. The flow of oil to the jack 300 is thus reduced and the rod thus moves relatively slowly under the drive of the pump 329 only.

During the phase IV-V, the earth is compressed between the piston 320 and a plate 318 which is a part of the press frame. The pressure applied to the earth in the chamber 317 of the mold 301 increases but the speed of the piston 320 at the end of the jack rod is slower than during the preceding phase.

It has been observed that the structure of the material making up the final bricks is free from irregularities. It is believed that this is due, at least for some earth based materials, to improve evacuation of the air which becomes trapped in the earth during compression. Satisfactory results have been obtained in which the speed of the compressing piston during the second or slow portion of the compression is about half the speed used during the first or fast portion. This simply requires that both pumps 329 and 330 should deliver oil at the same rate.

The oil pressure in the hydraulic circuit of the jack 300 increases to a value which depends on the setting of a pressurestat 319 connected to the hydraulic circuit 321. A value of 260 bars has proved satisfactory. When the said value is reached, the contact in the pressurestat 219 powers a handsettable delay circuit 322 and simultaneously turns off the winding 336, thus bringing the valve 335 to its intermediate position $335_2$. As a result the liquid from the pump 329 is directed to the tank 340, and the liquid from the pump 330 is likewise directed to a collecting tank. This stage constitutes the end of compression and the rod ceases to move.

The next phase V-VI is a timing phase under the control of the time delay circuit 322. During this phase, the liquid from both pumps 329 and 330 is directed to the tank 340 and the supply orifices to the jack 300 are likewise in communication with the tank 340.

During this phase, the moving portion of the jack 300, ie. the rod 305 and the piston, is unpowered and drops under its own weight through a distance which is usually about 5 to 10 mm. The position corresponding to stage VI is practically identical to that shown in FIG. 15, except that the moving parts of the jack 300 have dropped by the said 5 to 10 mm. The product in the chamber 317 reaches its final volume by means of an elastic phenomenon. It has been observed that by using a time delay to ensure that the product decompresses while inside the mold, the end product is of uniform size. This may be explained by the fact the elasticity which remains in the material is allowed to act while the mold remains fully closed. The time delay thus needs to be adjusted to match the water content of the earth-based material being compressed. If prior tests indicate that the compressed product tends to expand, then the mixture is too wet and the time delay needs to be increased to give the material time to stabilize in the mold.

The passage through phase VI-VII to reach stage VII is under the control of the time delay contact.

This is the second phase in which the moving equipment comprising the mold 301 and the jack 300 is moved forwards. This stroke takes place under the action of the second jack 306. The equipment moves forwards until an index 323 on the body of the jack 300 is detected by a position detector 324, which then causes the forward motion to stop (FIG. 16) and authorizes passage through phase VII-VIII to reach stage VIII.

Figure 17:
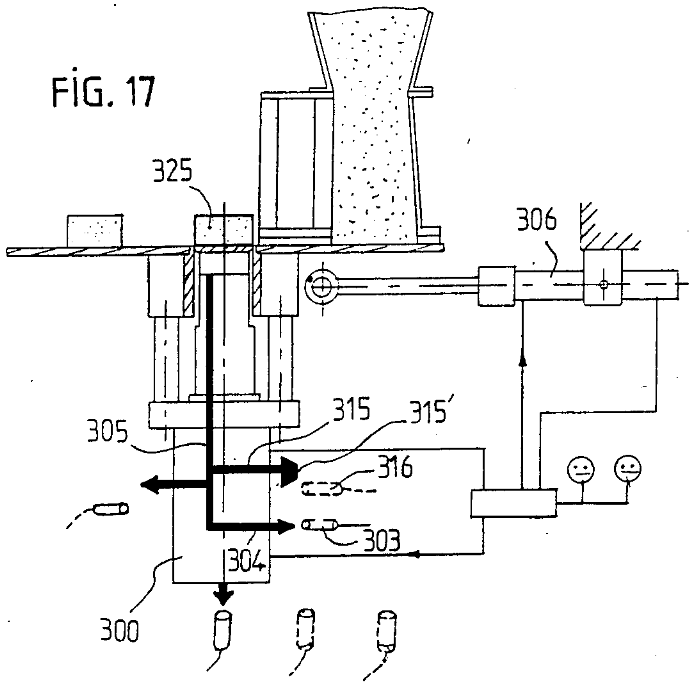

During phase VII-VIII, the rod 305 of the jack 300 again moves upwardly. The compressed molded product 325 is expelled from the chamber 317. Since the index 315 is still co-operating with the detector 316, the ejection begins slowly. It continues at higher speed once the index 315 is clear of the detector 316. The end of ejection condition is shown in FIG. 17.

Once ejection is over, the index 304 co-operates with the detector 303 which authorizes passage to the next stage which is stage I again, the mold is moved backwards and the above-described cycle recommences.

The maximum pressure developed during brick manufacture is fixed as a function of prior test results on any given raw material.

To obtain bricks of the desired height, the initial volume is of the chamber 317 is varied by adjusting the position in which the index 312 co-operates with the detector 311. As shown diagrammatically in FIG. 12, the flow chamber 326 of brick-making material is provided with one or more feed screws 327 of the Archimedes type and/or of external vibrator means 328 to improve downward movement of the earth powder. Filling the chamber 317 under vibration and under pressure supplied by the screw 327 helps to ensure that the resulting bricks are of uniform quality.

Figure 19:
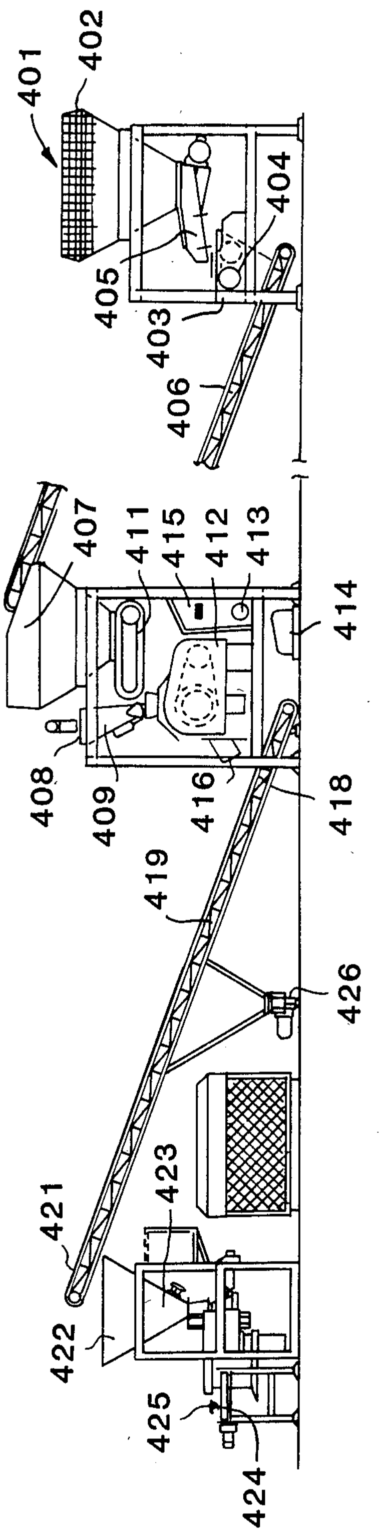
FIG. 19 is a diagrammatic side view of an installation including a plurality of pressing machines.
Figure 20:
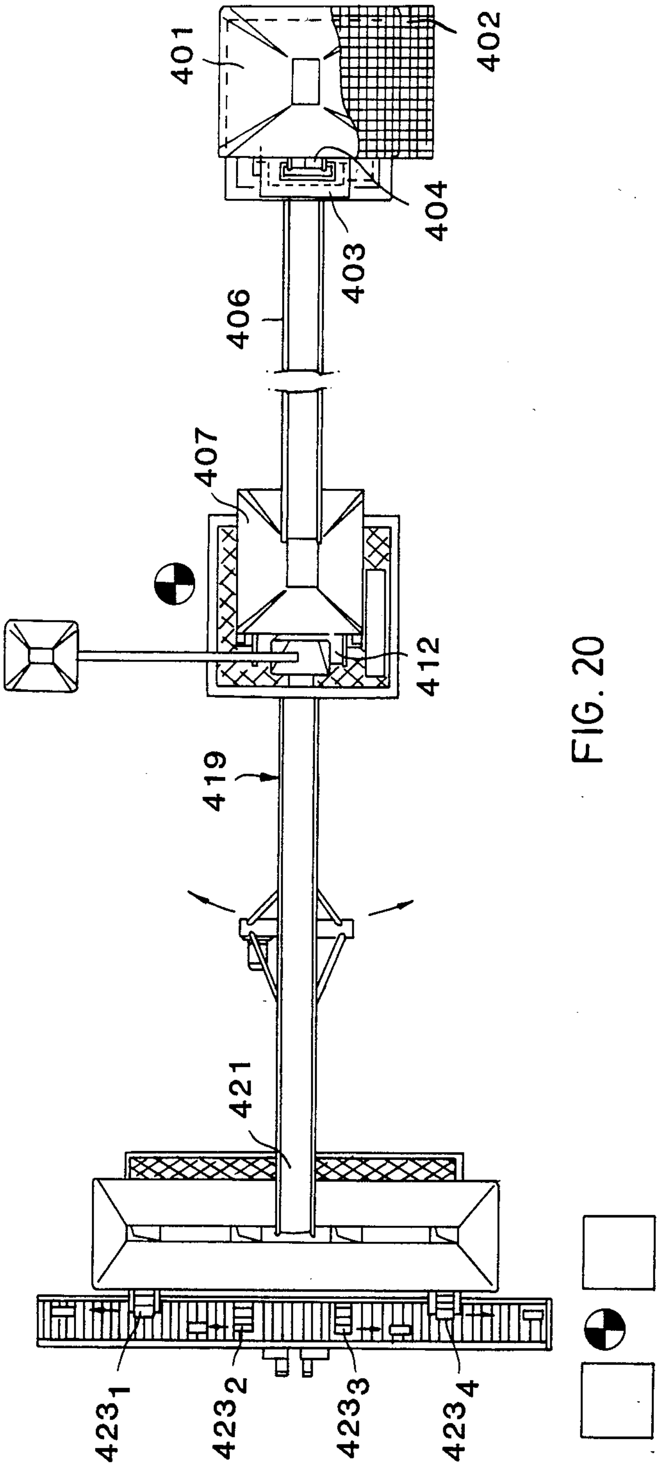
FIG. 20 is a plan view corresponding to FIG. 19.

Reference is now made to FIGS. 19 and 20 which relate to an installation comprising a machine of the type described above. The installation comprises a loading hopper 401 with a hinged grating 402. From the hopper, the material passes via a vibrating feeder 405 to a clump crusher 403 including a cylinder 404.

The crushed produce arrives at the bottom end of a feed belt 406 which conveys it to a buffer hopper 407. An auxiliary hopper 409 is disposed adjacent to the buffer hopper 407 for receiving bags of cement which are ripped open thereby and which feeds the cement to a cement weighing hopper 409. The buffer hopper 407 has an extractor 411 and the earth and the cement are fed to a mixer 412.

The hoppers 407 and 408 and the mixer 412 are parts of a mixing module which further includes a feed pump 413, a water dispensing device for supplying measured quantities of water, a compressor 414, and a control station 415.

Figure 21:
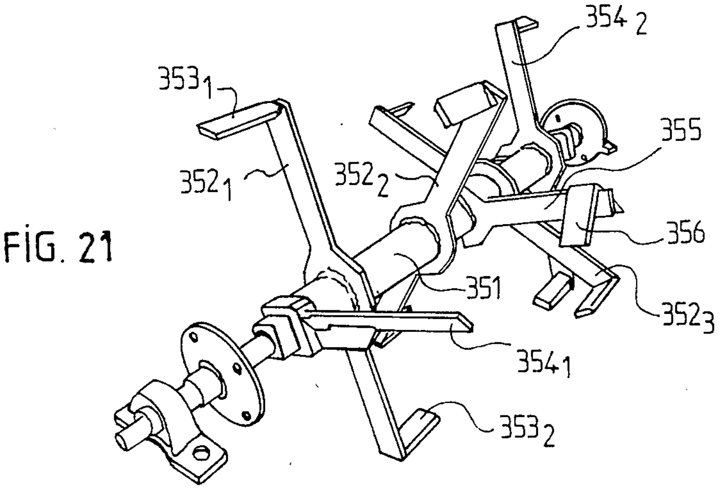
FIG. 21 is a perspective view of a mixer blade.

The outlet 416 from the mixer 412 which receives earth from the extractor 411 and cement from the weighing hopper 409 is over the bottom end of a pointable conveyor belt 419 whose top end feeds a press apparatus in accordance 422 with the invention. The press hopper advantageously includes a mixer as shown in FIG. 21. The mixer comprises a shaft 351 fitted with radial arms 352 distributed over its length and extending in various angular directions. A diametrical arm $352_1$ has mixing blades $353_1$ and $353_2$ at its ends. The same is true of further diametrical arms $352_2$ and $352_3$. The ends of the shaft 351 have end scraping arms $354_1$ and $354_2$. A radial arm 355 has a load-distributing V 356 at its end. The earth arrives from the conveyor belt in the middle of the a common hopper tank for feeding four presses. The V serves to urge the incoming earth to left and to right, with the mixer turning whenever the belt is feeding earth.

The outlet 423 from from each press lies over a roller conveyor 424 on which a brick 425 is drawn.

The installation shown in FIGS. 19 and 20 has four identical presses whose respective outlets are referenced 423.1, 423.2, 423.3 and 423.4. All four are fed with earth from the same conveyor belt 419 which can be swung through an arc by means of a support wheel 426.

Figure 22:
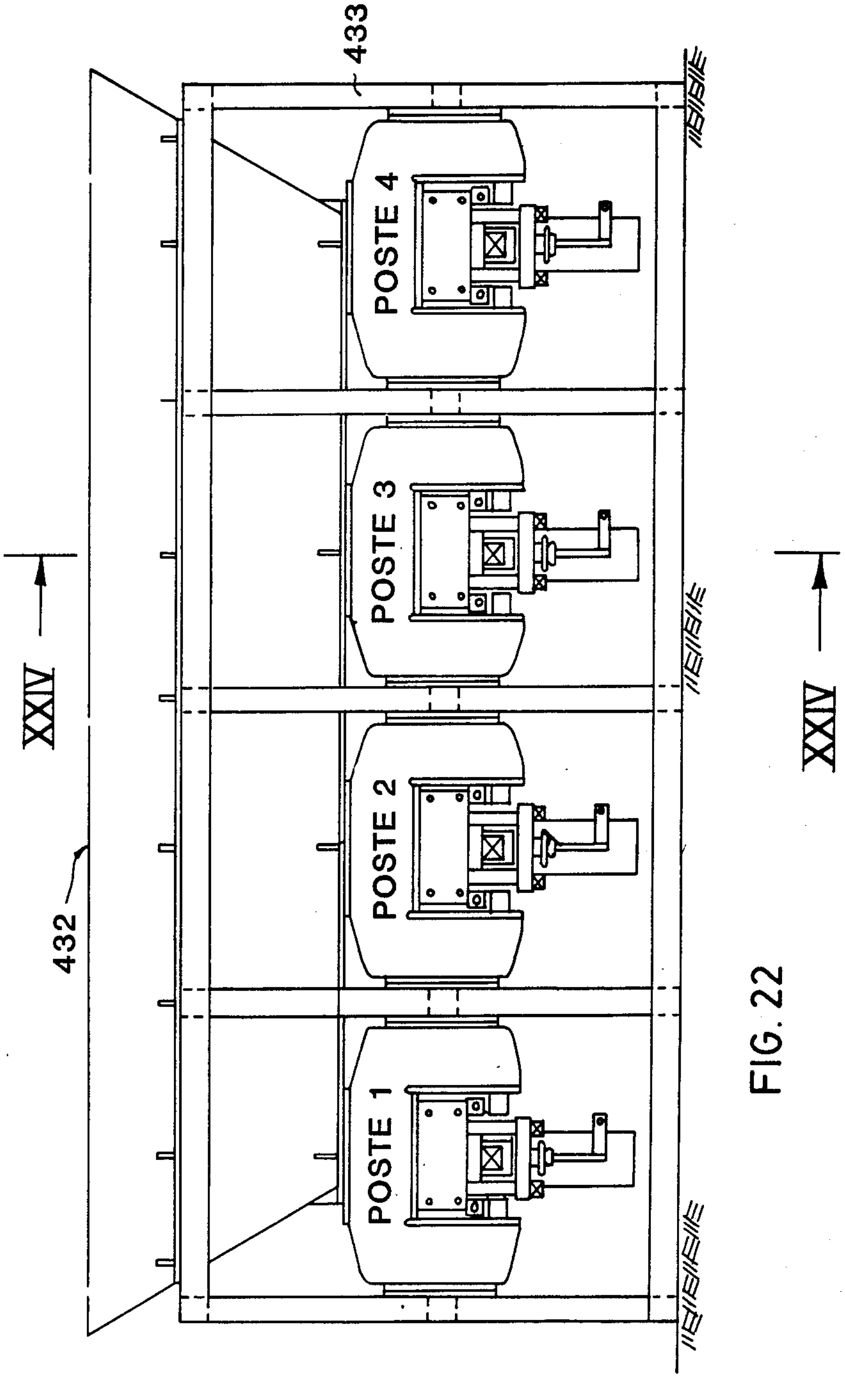
FIG. 22 is a front view of an installation including four press stations.
Figure 23:
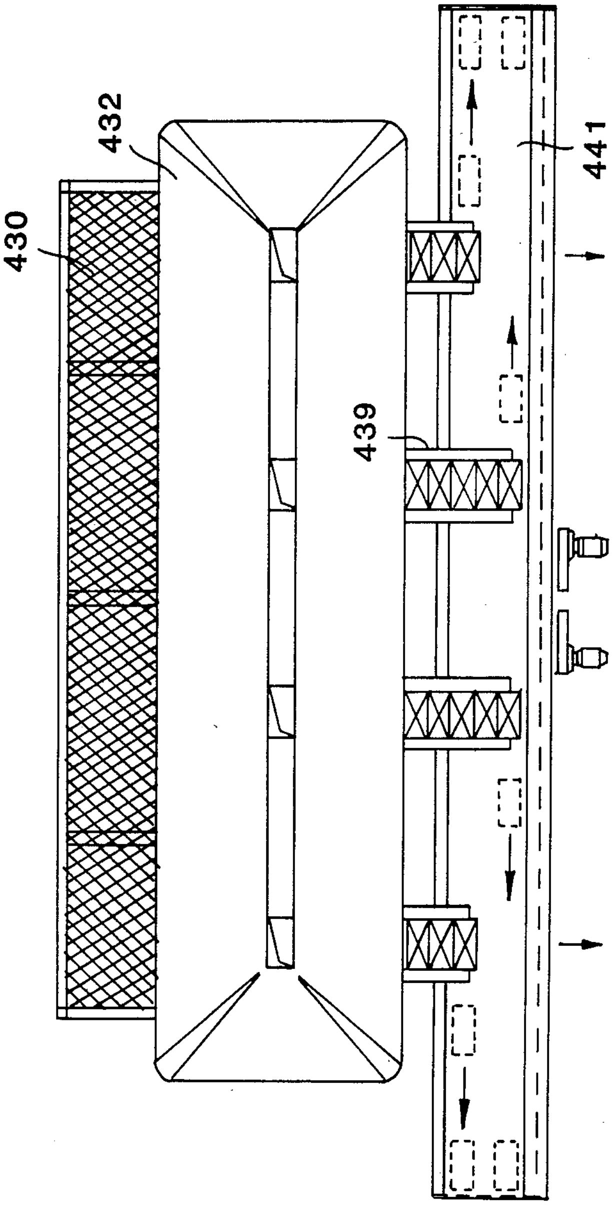
FIG. 23 is a plan view on a larger scale of a portion of FIG. 20.
Figure 24:
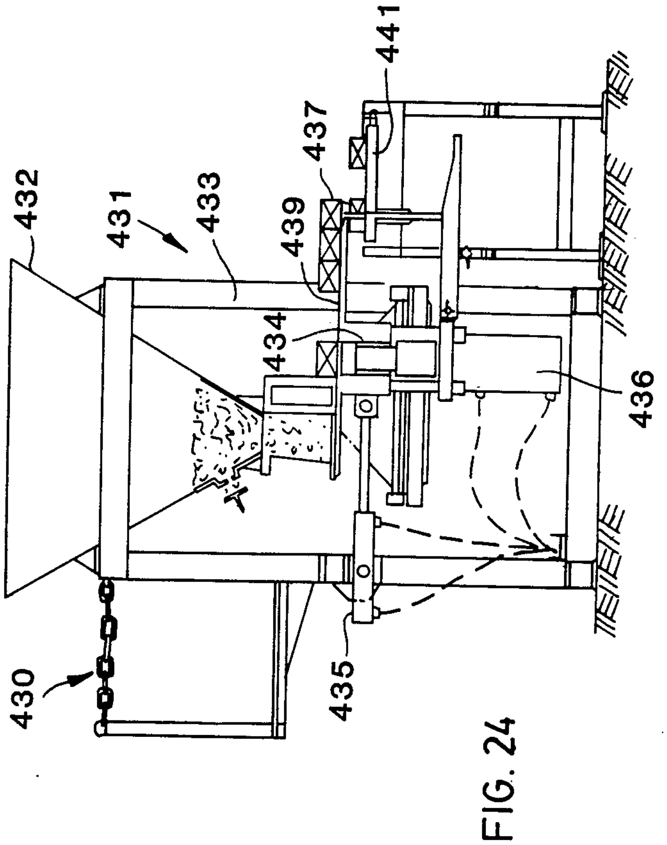
FIG. 24 is a section on a line XXIV—XXIV of FIG. 22.

A four-press module is shown in FIGS. 22 to 24. The earth is delivered by a bucket loader. FIG. 23 has arrows showing the directions in which the products are moved.

FIG. 24 is a diagrammatic view of a press 431 having a hopper 432 mounted on a frame 433 which also supports a gangway 430. The press frame 433 is under the hopper 432. The mold 434 is horizontally displaced by a jack 435. A second jack 436 provides the compression. Finished products 437 follow corridors 439 to reach a conveyor 441 having a product stacking device at its end.

The installation also includes a power unit under the control of programmable control means.

I claim:

1. A machine for manufacturing building bricks by agglomerating an earth-based material, the machine being of the type comprising:

a frame;

a mold composed of a chamber having side walls that are parallel to a generator direction and a piston which is free to move inside the chamber along the said generator direction under the control of piston actuator means, one end of the chamber being constituted by the said piston and the other end of the chamber comprising an opening of the same section as the chamber;

feed means for feeding said chamber with a compressible earth-based material;

a compression plate suitable for closing the said opening to enable the piston to compress the material contained in the chamber, the said feed means and the said compression plate being fixed to the said frame of the machine;

and means for disengaging the said opening relative to the said plate to enable the compressed product to be removed from the chamber;

the improvements wherein:

the said piston actuator means comprise a pressure driven jack;

moving means are provided for moving the mold, the piston and its actuator means, relative to the frame and successively positioning the mold opening in a first position opposite the said feed means for filling the mold chamber, then in a second position opposite the said compression plate for compressing the mold fill, and then in a third position in which said opening is free from the compression plate and the jack is operative to eject the molded product from the chamber via the opening; and means are provided for turning off the pressure action of the jack prior to moving the said mold, the piston and its activating means from the first position to the second position.

2. A machine according to claim 1, including means for reducing the speed of the piston towards the end of the compression stroke.

3. A machine according to claim 1, wherein the said feed means for feeding earth-based material include a gravity flow chamber of downwardly flared section, and wherein the opening of the variable volume chamber is movable with said mold, piston and actuator means in a horizontal plane to occupy a position below said flow chamber.

4. A machine according to claim 1, wherein the piston is movable from a position flush with the plane of the opening to the said chamber to a predetermined retracted position inside the said chamber, a detector being provided to accurately detect the arrival of the piston in said position.

5. A machine according to claim 1, wherein the frame includes at least one horizontal slideway support for supporting at least one horizontal slideway fixed to the mold, piston and activating means, guide means for the mold, piston and activating means being provided on said slideway support(s) and being at least partially protected from the forces resulting from the compression of the earth-based material between the piston and the compression plate.

6. A machine according to claim 5, wherein at least one rubbing plate is provided between the said slideway support and the slideway.

7. A machine according to claim 1, wherein the mold is assembled in a manner which is dismountable and interchangeable with the said jack.

8. A machine according to claim 1, wherein the said frame comprises two parallel vertical arch-shaped plates which have their open sides at the bottom and which are horizontally aligned, the mold and the jack being mounted for horizontal movement inside said plates.

9. A machine according to claim 1, wherein said moving means comprise a second jack suitable for horizontally moving the mold, the piston and the activating means between the first, second and third positions in a first direction and from the third position to the first position in the opposite direction.

10. A machine according to claim 1, including a control logic circuit for performing a cycle comprising in succession:

vertically displacing the piston downwardly under the feed means to a predetermined position for filling the chamber with a fixed quantity of compressible material while in the first position;

displacing the mold, the piston and the activating means in translation from the first position to the second position;

compressing the material in the chamber between the piston and the compression plate, initially just up to a value corresponding to a predetermined position of the piston, and subsequently up to a maximum value corresponding to the piston rod being fully extended, the displacement of the piston during said second phase taking place more slowly than during the first phase at the second position;

displacing the mold, the piston and the activating means from the second position to the third position;

displacing the piston vertically upwardly to eject the compressed product through the opening to the mold while in the third position; and returning the mold, the piston and the activating means from the third position to the first position.

11. A machine according to claim 10, including means for releasing the pressure in the mold chamber before moving the mold, the piston and the activating means from the second position to the third position, said pressure being released prior to moving for sufficient time to enable the compressed earth-based material to expand elastically while still restrained by the mold.

12. A machine according to claim 1, wherein the feed means includes a mixing shaft in the flow chamber.

13. A machine according to claim 1, including a tank for mixing earth with cement, said tank including a mixing shaft fitted with mixer blades and blades for scraping the walls of the tank.

14. A machine according to claim 1, wherein the feed means includes a feed chamber having a vibrator fitted to its wall.

15. A machine according to claim 10, wherein the various phases of operation are controlled by induction based position detectors that co-operate with indexes.

* * * * *